United States Patent [19]

Nishikawa

[11] 4,154,486
[45] May 15, 1979

[54] CEMENT MIXTURE BLOWING DEVICE

[75] Inventor: Akira Nishikawa, Tokyo, Japan

[73] Assignee: Plibrico Japan Co., Ltd., Tokyo, Japan

[21] Appl. No.: 845,465

[22] Filed: Oct. 25, 1977

[30] Foreign Application Priority Data

Nov. 10, 1976 [JP] Japan .................................. 51-135044

[51] Int. Cl.² ............................................. B65G 53/46
[52] U.S. Cl. ........................................ 406/48; 193/2 B; 406/63; 406/75
[58] Field of Search ....................... 302/49, 51, 56, 57; 193/2 B; 222/194, 197, 200, 217, 240, 242; 198/533, 750, 752, 771

[56] References Cited

U.S. PATENT DOCUMENTS

| | | | |
|---|---|---|---|
| 1,686,804 | 10/1928 | Files | 222/197 |
| 1,932,520 | 10/1933 | Horsch | 193/2 B X |
| 2,759,614 | 8/1956 | Stock | 198/533 X |
| 2,765,894 | 10/1956 | Craig | 193/2 B |
| 3,161,442 | 12/1964 | Reed | 302/49 |
| 3,472,431 | 10/1969 | Bodine | 302/56 X |

Primary Examiner—Robert B. Reeves
Assistant Examiner—James L. Rowland
Attorney, Agent, or Firm—Hane, Roberts, Spiecens & Cohen

[57] ABSTRACT

A cement mixture is mixed or agitated in a hopper by rotary blades and is fed through a feed duct or chute normally imparted with vibrations from a vibrator to cement mixture receiving pockets in a rotary disk. The cement mixture in the pocket brought to an unloading position is forced to be discharged through a discharge pipe under the force of the air under pressure admitted into the pocket through a blow pipe. Since the feed duct or chute is normally vibrated, even a highly viscous cement mixture containing water can be fed through the feed duct or chute into the pockets of the rotary disk in a stable manner so that the cement mixture may be prevented from bridging across the pockets of the rotary disk, thereby not dropping into them.

2 Claims, 10 Drawing Figures

FIG. 8

| FIG. 8A | FIG. 8B |

FIG. 8B

| DISCHARGE AIR PRESSURE IN Kg/cm² | DISCHARGE IN m³/h | REMARKS |
|---|---|---|
| 3~4 | 2.0 | WITH NO VIBRATOR |
| = | 4.0 | WITH VIBRATOR |
| = | 4.8 | = |
| = | 5.5 | = |
| = | 3.8 | = |
| = | 6.0 | = |
| = | 7.0 | = |
| = | 6.3 | = |
| = | 2.5 | WITH NO VIRRATOR |

FIG. 8A

| MATERIALS | RATIO IN BULK CEMENT:SAND:WATER | LARGEST PATICLE SIZE | SLUMP VALUE IN mm |
|---|---|---|---|
| CEMENT MORTAR | 1:4 | RIVER SAND (MEDIUM SIZE) | 30 |
| = | = | = | 25 |
| = | = | = | 35 |
| CONCRETE | 1:4:2 | GRAVEL, 5mm IN DIAMETER | 35 |
| = | = | GRAVEL 20mm IN DIAMETER | 0 |
| = | = | = | 12 |
| = | = | = | 22 |
| = | = | = | 35 |
| = | = | = | 22 |

CEMENT MIXTURE BLOWING DEVICE

BACKGROUND OF THE INVENTION

The present invention relates to a cement mixture blowing device capable of blowing not only a dry cement mixture but also a highly viscous cement mixture mixed with water.

The methods and devices for blowing a cement mixture (which refers to "a cement mortar mixture, a concrete mixture and so on" in this specification) have long been investigated, and various cement guns have been devised and demonstrated. However these prior art cement mixture blowing devices have been solely designed to blow a dry mixture of cement and sand. That is, the mixture of cement and sand in suitable ratio is blown through a nozzle by the air jet, and water is added to the mixture in the nozzle to give cohesion at the point of impact.

When cement and water is proportioned in suitable ratio, mixed well, placed and cured, a uniform and high quality structure and adequate durability may be obtained. However, with the prior art cement gun, the mixture of cement and sand cannot be well mixed and kneaded with water so that the mixture is blown before water is sufficiently diffused among the cement particles. As a result, finely divided water and cement particles are alternately impinged against an object surface so that a segregation of cement particles and the nonuniform structure tends to occur very frequently. In addition, an operator must check the cohesion of the impinged cement mixture so as to control the volume of water added to the cement-sand mixture by operating control means attached to the nozzle. As a consequence, insufficient supply of water frequently results. Furthermore, with the prior art cement mixture blowing devices, the experience and skill of the operator greatly influence the quality of cement mixture placed. For instance, an unskilled operator tends to blow the cement mixture in the form of a layer so that the nonuniform structure and insufficient strength or durability result.

In order to solve these problems, there has been invented and demonstrated a cement mixture blowing device of the type disclosed in, for instance, U.S. Pat. No. 3,161,442. In this device a cement mixture is fed into pockets of a rotary disk so that upon rotation of the rotary disk, the pockets filled with the cement mixture are successively brought to a discharge or unloading station. In the discharge station the pocket is hermetically sealed, and the air under pressure is admitted into the sealed pocket so that the cement mixture is discharged through a discharge pipe and blown through a nozzle against an object surface. When the cement mixture is completely or almost dried, its viscosity is low so that the cement mixture may be smoothly fed into the pockets of the rotary disk, discharged through the discharge pipe and blown through the nozzle in a satisfactory manner. However, when water is proportioned, mixed and kneaded with the cement mixture, the viscosity of the cement mixture increases so that the cement mixture tends to bridge over the pockets of the rotary disk and will not drop into them. As a result, empty pockets are successively transported to the discharge or unloading station so that no cement mixture can be blown. If the agitator blades are so arranged as to break such bridge, this problem may be solved. However, in practice such arrangement is impossible because of the installation space of the blow and discharge pipes. That is, the agitator blades cannot pass in close proximity to the top surface of the rotary disk. Thus, the cement mixture blowing device disclosed in U.S. Pat. No. 3,161,442 cannot blow a highly viscous cement mixture mixed with water.

SUMMARY OF THE INVENTION

One of the objects of the present invention is, therefore, to provide a cement mixture blowing device capable of blowing not only dried particles but also a viscous mixture of cement, sand and water.

Another object of the present invention is to provide a cement mixture blowing device of the type described above which is simple in construction, compact in size, light in weight yet highly reliable in operation and is capable of attaining a high discharge rate.

Briefly stated, to the above and other ends the present invention provides a cement mixture blowing device wherein a cement mixture is fed from a hopper through a vertically extending feed duct or chute into pockets of a rotary disk; a vibrator is provided to impart vibrations to the feed duct or chute in order to facilitate the flow of the cement mixture therethrough; and a rotary blade assembly is disposed within the hopper so that the cement mixture in the hopper may be forced into the feed duct or chute.

BRIEF DESCRIPTION OF THE DRAWINGS

FIG. 8 shows some data obtained from the experiments conducted with the cement mixture blowing device in accordance with the present invention.

DESCRIPTION OF THE PREFERRED EMBODIMENT

Figure 1:
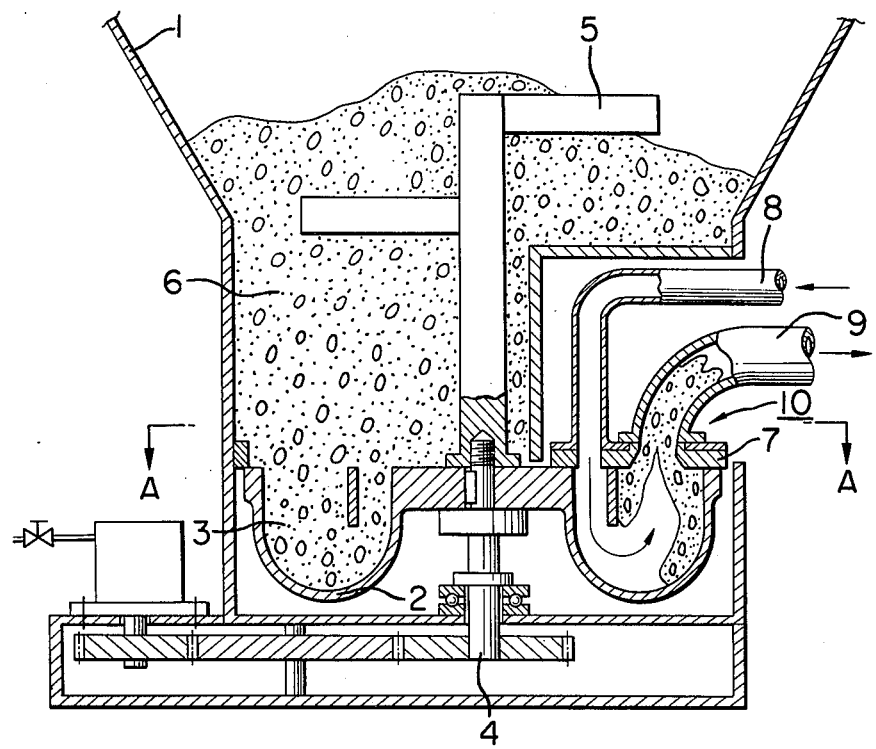
FIG. 1 is a longitudinal or vertical sectional view of a prior art cement mixture blowing device.
Figure 2:
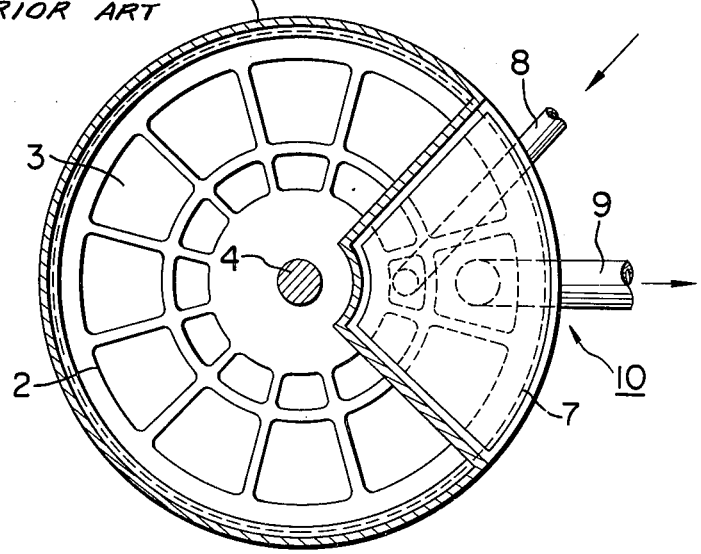
FIG. 2 is a cross sectional view taken along the line A—A of FIG. 1.
Figure 3:
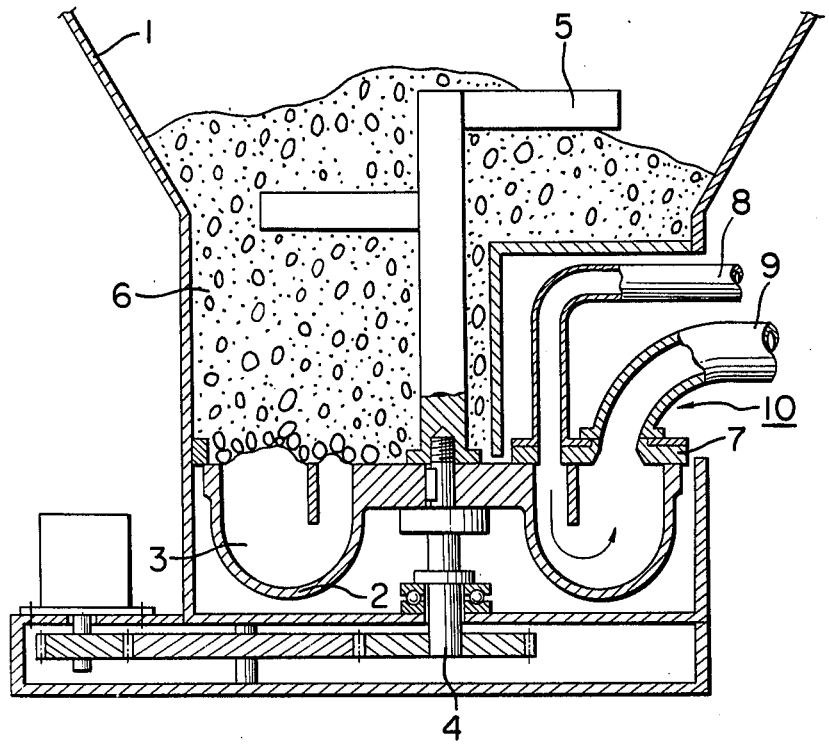
FIG. 3 is a view similar to FIG. 1 but illustrating a cement mixture bridging over pockets of a rotary disk, thereby hindering the cement mixture from dropping into the pockets of the rotary disk.

Prior Art, FIGS. 1, 2 and 3

Prior to the description of a preferred embodiment of the present invention, a prior art cement mortar blowing gun will be described briefly in order to distinctly and specifically point out its disadvantages. A rotary disk 2 which is sealingly and rotatably attached to a hopper 1 is provided with a plurality of circumferentially equiangularly spaced pockets 3 (See FIG. 2) roughly semicircular in cross section, and is drivingly coupled to a drive shaft 4. An agitator 5 is also drivingly coupled to the drive shaft 4 for mixing or agitating a cement mixture 6 in the hopper 1. As the rotary disk 2 is rotated, the cement mixture 6 drops into the pockets 3 and is transported to a discharge section generally indicated by the reference numeral 10. The discharge section 10 comprises a rubber packing 7 adapted to seal each pocket 3 filled with the cement mixture, a pressurized air blowing pipe 8 extended through the rubber packing for blowing the air under pressure into the air-tightly sealed pocket 3 and a discharge pipe 9 for discharging the cement mixture from the pocket 3. The air under pressure charged into the pocket 3 through the blowing pipe 8 forces the concrete mixture in the pocket to be discharged through the discharge pipe 9 and blown through a nozzle (not shown) over a formed surface or a prepared concrete surface.

When the cement mixture 6 is well or satisfactorily dried, its viscosity is low so that the cement mixture 6 may smoothly drop into the pockets 3 from the hopper 1 and may be continuously blown. Enough water is added at the nozzle to give the cohesion at the point of impact. However, when the cement mixture 6 contains water, the viscosity of a concrete mixture becomes high so that, as shown in FIG. 3, the mixture 6 tends to bridge the pocket 3 and will not drop into the pocket 3. As a result, the empty pockets 3 are successively transported to the discharge section 10 so that no mixture can be blown.

One solution to this problem is to arrange the agitator blade 5 in such a manner that it may break the bridge of the mixture immediately above the pocket 3. However, in practice this arrangement is impossible because of the installation space of the blowing pipe 8 and the discharge pipe 9. Thus, the cement mixture blowing device disclosed in the above U.S. Patent cannot blow a highly viscous cement mixture added with water.

The Invention, FIGS. 4 through 8

Figure 5:
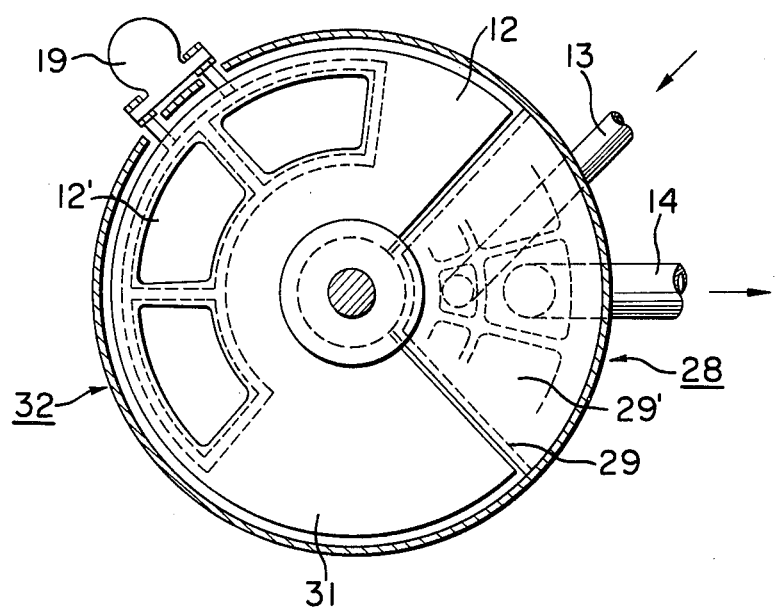
FIG. 5 is a cross sectional view taken along the line B—B of FIG. 4.
Figure 4:
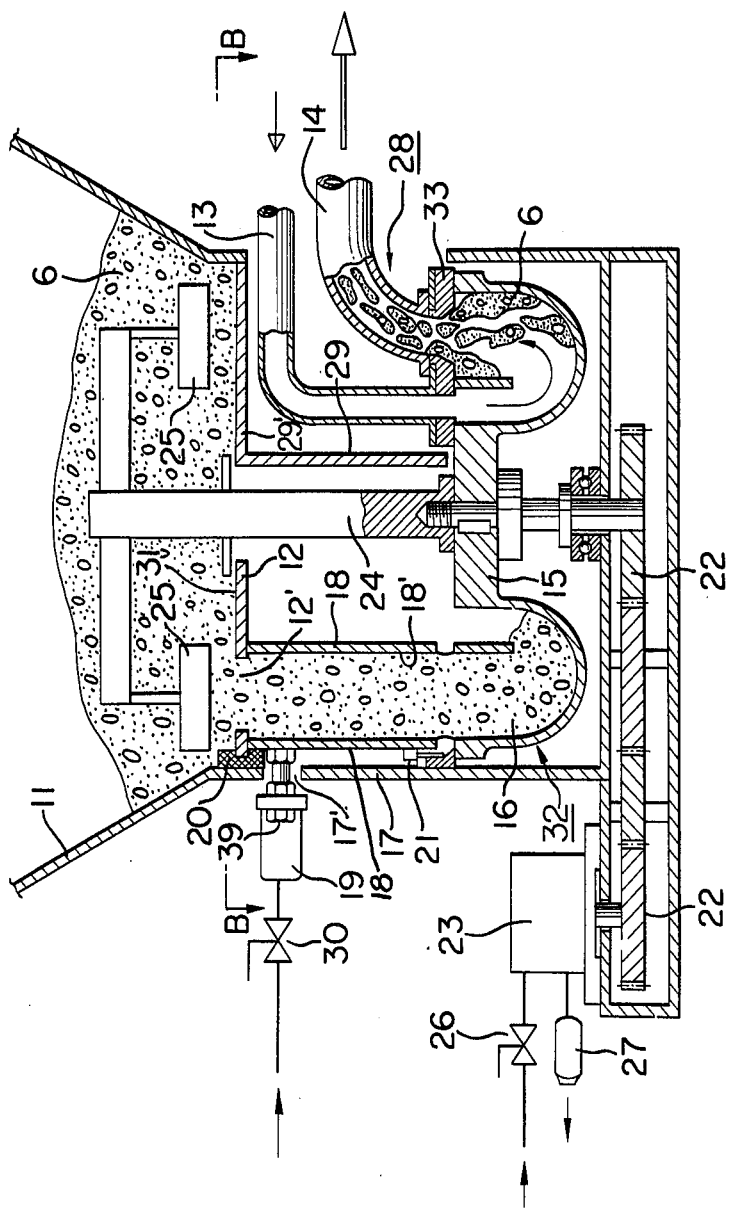
FIG. 4 is a vertical sectional view of a preferred embodiment of a cement mixture blowing device in accordance with the present invention.

Referring to FIGS. 4 and 5, a cement mixture blowing device in accordance with the present invention includes, in general, a hopper 11, a cement mixture feed section 32, a cement mixture discharge section 28 and drive means. The bottom 31 of the hopper 11 is defined by a segment-shaped horizontal plate 12 on the side of the supply or feed section 32 and a complementary segment-shaped horizontal plate 29' integral with a vertical partition wall 29 which separates the discharge section 28 from the feed section 32. The horizontal plate 12 is formed with a feed opening or port 12' (See FIG. 5) which may be partitioned into a plurality of small openings or sub-ports depending on the viscosity of a cement mixture used. The feed port 12' is communicated with a feed duct 18 extended vertically downwardly and terminated in the proximity of the upper surface of a rotary disk 15 having a plurality of circumferentially equiangularly spaced pockets 16. The feed duct 18 may be also subdivided into a plurality of passageways equal in number to the subports of the feed port 12'.

A pneumatic vibrator 19 to be described in detail hereinafter is securely attached to the feed duct 18 with bolts 39 extended through openings 17' formed through shell 17. In order to prevent the transmission of vibrations of the feed duct 18 to other components, vibration isolators 20 and 21 made of, for instance, felt are interposed between the feed duct 18 on the one hand and the horizontal plate 12, the hopper 11 and the shell 17.

The rotary disk 15 with the pockets 16 for transporting the cement mixture from the feed duct 18 to the discharge section 28 is rotated through gears 22 by a pneumatic motor 23, and a rotary shaft 24 upwardly extended from the rotary disk 15 coaxially thereof is provided with a plurality of agitating or mixing blades 25 which are so arranged as to rotate in close proximity to the bottom surface 31 of the hopper 11. When a valve 26 is opened, the air under pressure is forced into the pneumatic motor 23 to drive the same, and the air is exhausted from the pneumatic motor 23 through a muffler or silencer 27 for suppressing the noise.

The pneumatic vibrator 19 is provided in order to facilitate the flow of the cement mixture through the feed duct or chute 18 so that the mode and direction of vibrations are not limited as far as these vibrations serve to increase the flow of the cement mixture through the feed chute 18. However it is preferable that the vibrator 19 imparts in the horizontal plane some rotary vibrations to the cement mixture in the feed duct 18 so that the cement mixture 6 may be separated from the interior wall surface 18' of the feed duct or chute 18 and consequently the friction between the cement mixture 6 and the interior wall surface 18' of the feed duct 18 may be considerably decreased, whereby the flow of the cement mixture 6 through the feed duct 18 may be much facilitated. In addition to the pneumatic vibrator 19, any other suitable motor-driven and magnetic type vibrators may be employed, but it is preferable to use the pneumatic vibrator 19 because the vibration frequency can be continuously varied depending upon the viscosity and other properties of the cement mixture.

Figure 6:
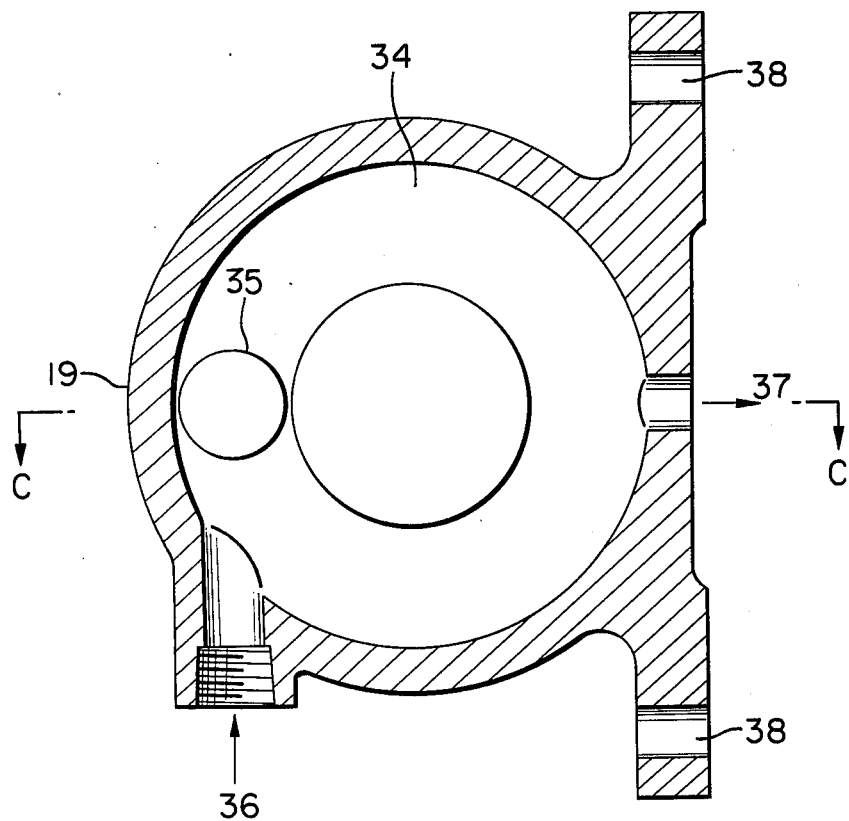
FIG. 6 is a cross sectional view of a pneumatic vibrator used in the present invention.
Figure 7:
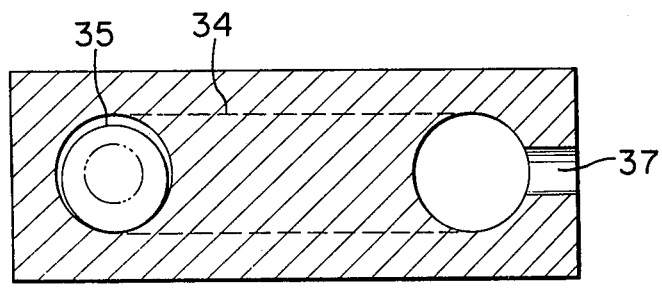
FIG. 7 is a sectional view taken along the line C—C of FIG. 6.

The pneumatic vibrator 19 used in the present invention is shown in detail in FIGS. 6 and 7. A housing of the pneumatic vibrator 19 is formed with an annular race 34 circular in cross section communicated with an inlet port 36 opening tangentially to the race 34 and an outlet port 37 opening normal to the race 34, and a steel ball 35 having a diameter slightly smaller than the diameter of the race 34 so that the steel ball 35 may freely travel through the annular race 34 under the force of the air under pressure admitted into the race 34 through the inlet port 36, the air being discharged through the outlet port 37. The pneumatic vibrator 19 with the above construction is securely attached to the feed chute 18 with the bolts 39 extended through mount holes 38 formed through a flange portion. Upon energization, the steel ball 35 is forced to orbit or travel through the annular race 34 so that the feed duct 18 is caused to vibrate in the horizontal direction and consequently the flow of the cement mixture therein may be facilitated as described above.

Referring back to FIGS. 4 and 5, the discharge section 28 includes a blow pipe 13 for admitting the air under pressure into the pocket 16 of the rotary disk 15 brought to the discharge section 28, a discharge pipe 14 for flowing the cement mixture 6 from the pocket 16 to a nozzle (not shown), and an elastomeric packing 33 for hermetically sealing the pocket 16 in the unloading position. The discharge section 28 with the above construction is separated from other parts and sections by the partition wall 29 in order to permit easy access to the packing 33 for replacement and adjustment.

Next the mode of operation of the cement mixture blowing device with the above construction will be described. First the valves 26 and 30 are opened to energize the pneumatic motor 23 and the pneumatic vibrator 19 and to rotate the rotary disk 15 and the rotary shaft 24 and hence the mixing or agitating blades 25. Upon rotation of the agitating or mixing blades 25, the cement mixture 6 charged into the hopper 11 is not only caused to be mixed or agitated but also forced into the feed port 12', and the cement mixture flows down the feed chute 18 by its own weight. The flow of the cement mixture through the feed duct 18 is accelerated by the vibrations imparted from the pneumatic vibrator 19 as described above. The cement mixture drops into the pockets 16 of the rotary disk 15, and is transported to the discharge section 28. When the pocket 16 filled with the cement mixture 6 is brought to the unloading position within the discharge section 28, it is hermetically sealed with the packing 33, and the air under pressure is admitted through the blow pipe 13, as indicated by the arrow, into the sealed pocket 16 so that the cement mixture is formed to flow through the discharge pipe 14 as indicated by the arrow to the nozzle (not shown) to be blown against a construction form or other surfaces. Upon rotation of the rotary disk 15, the cement mixture 6 is successively carried to the discharge section 28 while the cement mixture 6 in the hopper 11 is well mixed or agitated by the mixing or agitating blades 25 rotatable in synchronism with the rotary disk 15. Thus, the cement mixture 6 can be successively blown through the nozzle against an object.

Since the cement mixture blowing device in accordance with the present invention is pneumatically operated, that is, both the vibrator 19 and the motor 23 are pneumatically driven, the cement mixture blowing device may be used any place where no electric power is available when an engine driven compressor is used.

In addition to the cement mixture, the blowing device in accordance with the present invention may blow not only dry particles but also cement mortar and a concrete mixture of cement, aggregate and water, the aggregate being 20 mm in diameter. Furthermore, the correctly proportioned cement mixture may be continuously and smoothly blown so that the variation in qualities of the cement mixture placed due to the unsatisfactory cement mixture blowing ability of the conventional cement guns due to unskilled operators may be avoided, and the cement structures uniform in properties and stable in strength can be provided. In FIG. 8 there are shown some data obtained from the cement mixture blowing with the blowing device in accordance with the present invention.

What is claimed is:
1. A cement mixture blowing device comprising:
   a hopper for receiving a cement mixture;
   a rotary blade assembly rotatable in said hopper;
   a housing shell;
   a feed duct within said housing shell and extending downwardly from the bottom of said hopper and having a discharge opening;
   a rotary disk disposed below the discharge opening of said feed duct and disposed in cement mixture receiving relationship therewith, said rotary disk being provided with a plurality of cement mixture receiving pockets circumferentially and equiangularly spaced apart from each other and being adapted to rotate in synchronism with said rotary blade assembly;
   a vibrator attached to said feed duct through an opening formed through said housing shell, said vibrator being physically isolated from said shell whereby said vibrator imparts vibrations only to said feed duct;
   a blow pipe for admitting air under pressure into a pocket brought to an unloading position; and
   a discharge pipe for discharging cement mixture from the pocket in the unloading position, whereby the feed of the cement mixture into the pockets of said rotary disk may be facilitated by the vibrations imparted to said feed duct from said vibrator, and the cement mixture in a pocket in the unloading position may be forced to flow through said discharge pipe under the force of the air under pressure admitted in said pocket through said blow pipe for blowing against an object.

2. A cement mixture blowing device as set forth in claim 1 further comprising vibration isolator means interposed between said feed duct and said housing shell to prevent any cement mixture from dropping into a space between said feed duct and said housing shell and to prevent the resonance of said feed duct and said housing shell in response to the vibrations imparted to said feed duct from said vibrator.

* * * * *